(12) United States Patent
Müller

(10) Patent No.: US 6,749,257 B2
(45) Date of Patent: Jun. 15, 2004

(54) HEAD RESTRAINT FOR VEHICLES

(76) Inventor: Hermann-Frank Müller, Lyngsbergstr. 3a, D-53177 Bonn (DE)

( * ) Notice: Subject to any disclaimer, the term of this patent is extended or adjusted under 35 U.S.C. 154(b) by 93 days.

(21) Appl. No.: 10/020,317

(22) Filed: Oct. 30, 2001

(65) Prior Publication Data

US 2002/0149237 A1 Oct. 17, 2002

(51) Int. Cl.[7] ............................................. A47C 31/00
(52) U.S. Cl. ..................... 297/217.3; 297/391; 136/291; 136/251
(58) Field of Search .............................. 297/391, 217.1, 297/217.3, 216.12, 216.14; 136/291, 251

(56) References Cited

U.S. PATENT DOCUMENTS

| | | | | |
|---|---|---|---|---|
| 4,262,653 A | * | 4/1981 | Holland ....................... | 126/400 |
| 5,257,853 A | * | 11/1993 | Elton et al. .................. | 297/291 |
| 6,060,658 A | * | 5/2000 | Yoshida et al. .............. | 136/291 |
| 6,087,579 A | * | 7/2000 | Muskatevc ................... | 136/251 |
| 6,183,045 B1 | * | 2/2001 | Marfilius et al. ........... | 297/391 |
| 6,459,033 B1 | * | 10/2002 | Muller ......................... | 136/244 |

* cited by examiner

*Primary Examiner*—Peter R. Brown
*Assistant Examiner*—Stephen Vu
(74) *Attorney, Agent, or Firm*—Gudrun E. Huckett

(57) ABSTRACT

A head restraint for vehicles of any kind with a support with upholstery portion has two detachably connected half shells which have collectors for receiving and collecting light, corresponding solar modules for conversion of the light into electrical energy, and storage elements for storing this enemy. The half shell of the head restraint, arranged rearwardly in the travel direction, has a frame for receiving a detachable component for various purposes, such as an illuminated vanity mirror, a screen, or the like. Within a second removable component, polymer electrolyte membrane fuel cells with a hydrogen cartridge can be provided for additional enemy generation.

13 Claims, 3 Drawing Sheets

HEAD RESTRAINT FOR VEHICLES

BACKGROUND OF THE INVENTION

The invention relates to head restraints for vehicles of any kind. They are usually arranged so that they can be easily extended from the back rest of vehicle seats and adjusted with regard to their height. The head restraints are comprised of—for example—tubular supports with an upholstery portion in the area that is provided for resting the head of the passenger. This area can be comprised of two half shells made of plastic material onto which an upholstery cover is applied (DE 34 17872 A1).

SUMMARY OF THE INVENTION

The invention has the object to develop such a head restraint such that it not only provides the conventional protection of the head and—indirectly—of the spine but additionally can generate electrical energy within and outside of the vehicle.

Based on the aforementioned known head restraint, the invention for solving this object limits the head contact onto the central area of the head restraint which can be, for example, formed by a net (DE 197 33 030 C1) which upon a rear end collision is torn by an airbag which then takes over the protective function. The size of the normal head restraint, in general, serves only for ensuring that the passenger is comfortable in different seat positions, optionally also when resting, so that the head restraint area outside of the central area is used only infrequently. However, in order to ensure at the same time the stability of the entire head restraint, each head restraint half shell according to the invention has in its interior a reinforcing plastic frame which is configured such that outside of the supporting central area of the head restraint half shell, positioned forwardly in the travel direction, it contains collectors for receiving and collecting light as well as for light propagation to solar modules for light conversion into electrical energy which is stored in storage elements of a known type, in particular, embodied according to thin-film element technology. The head restraint half shell, rearwardly positioned in the travel direction, is in principle of the same configuration and contains in addition a frame for a removable component to be used for different purposes. Further advantageous details of the head restraint configuration according to the invention are defined in the dependent claims.

BRIEF DESCRIPTION OF THE DRAWINGS

The invention will be described and explained by the following by means of one embodiment wherein the configuration possibilities of the individual parts are left to the person skilled in the art. It is shown in.

DESCRIPTION OF PREFERRED EMBODIMENTS

Figure 1:
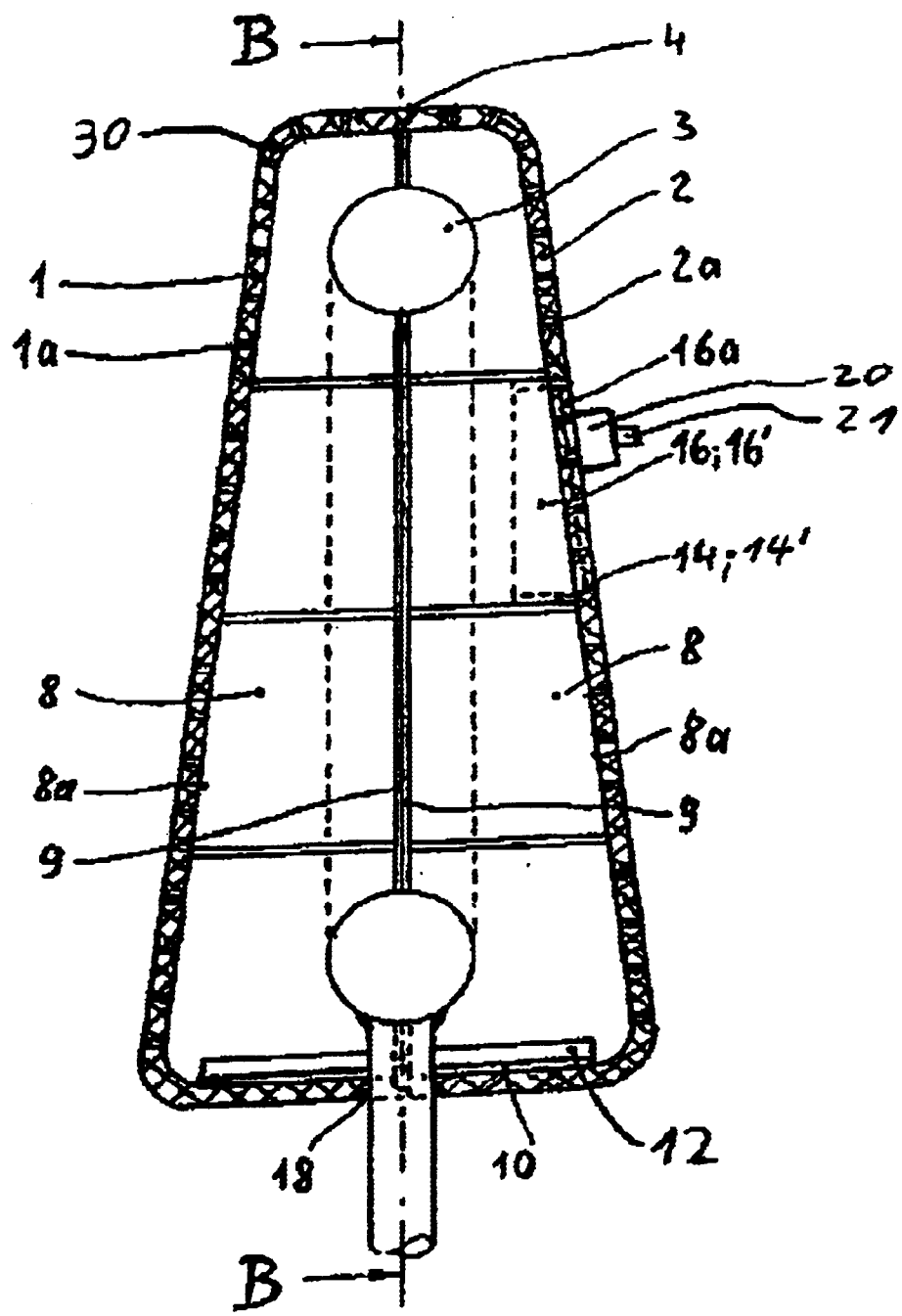
FIG. 1 a cross-section of the head restraint according to the invention according to the section line A—A of FIG. 2.
Figure 2:
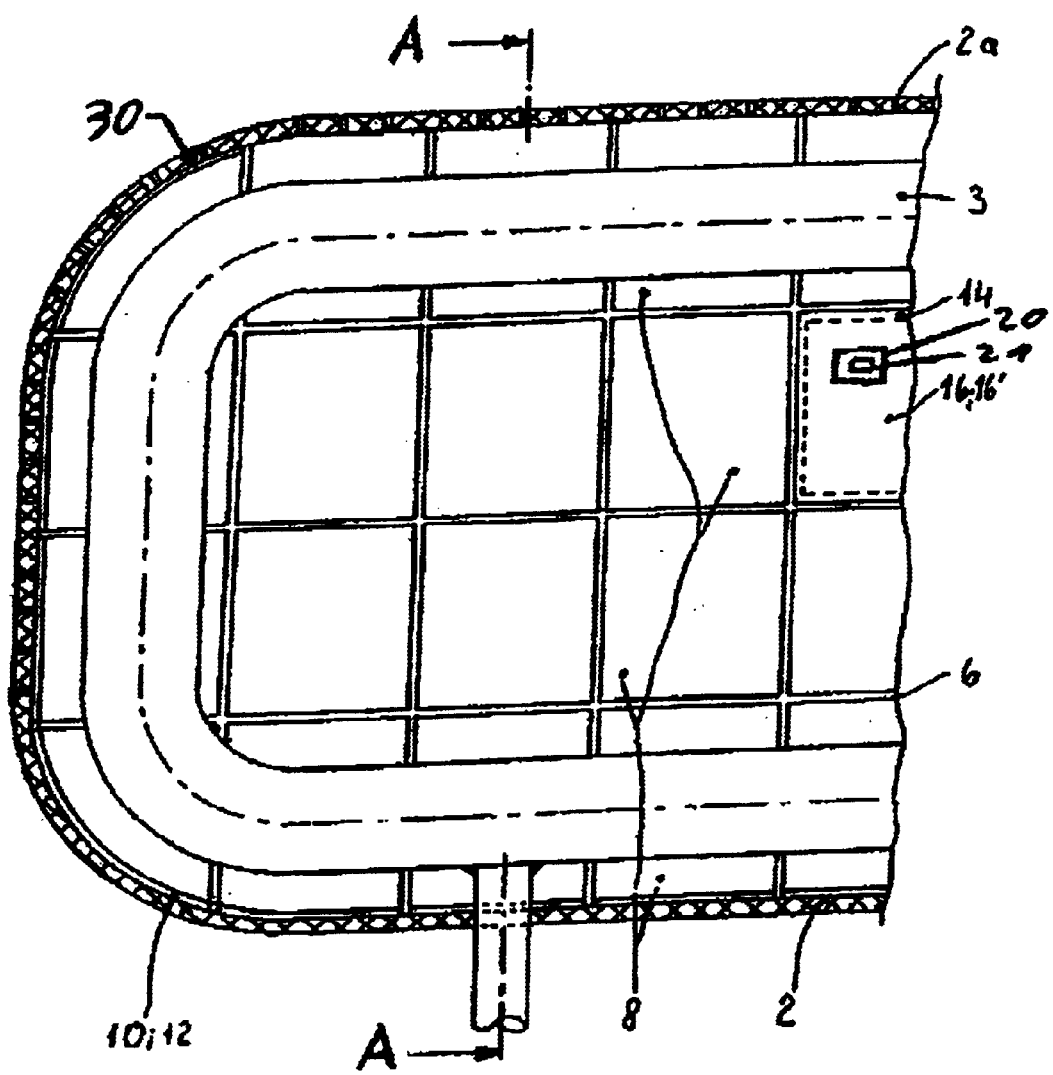
FIG. 2 a cross-section of the head restraint according to the invention according to the section line B—B of FIG. 1.
Figure 3:
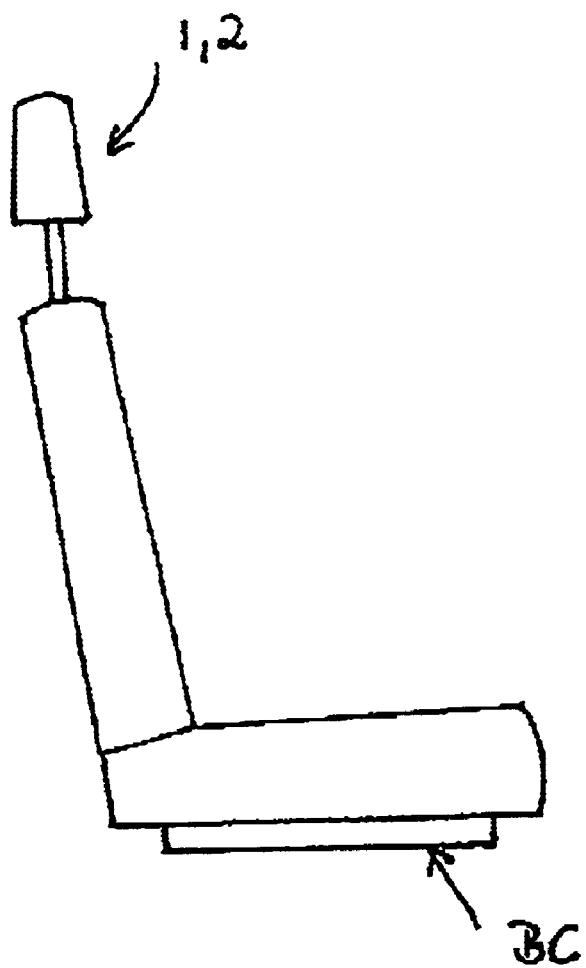
FIG. 3 shows a fuel cell BC underneath the vehicle seat.

The head restraint is comprised of a half shell 1, forwardly arranged in the travel direction, and a half shell 2, rearwardly arranged in the travel direction. The shells are made of reinforced plastic material, for example, manufactured as a blow-molded part which are detachably connected to one another at their facing edges. This connection 4 is so stable—for example, by means of arrangement and/or type of a screw connection, a snap connection or the like—that it does not impair the task of a head restraint, for example, in the case of a rear end collision and, moreover, does not present a risk for the passengers. The head restraint is connected to the backrest of the vehicle seat by means of a tubular carrier T that has a bracket-shaped and has two stays.

Each half shell 1, 2 has in its interior of a plastic cage 6 for receiving fluorescent collectors Fluk® 8 (of the Fraunhofer Gesellschaft) or fluorescent connections according to EP 0 046 861 B1 whose size and shape are determined by the designer taking into account the respective conditions. In addition to the central upholstery portion (not illustrated) for the head of the passenger and the support 3 provided in different embodiments, possibly also in the "fashionable" form of a hole which is covered by a net, in the form of an airbag or the like, the surface facing in the travel direction of the forward head restraint half shell 1 has in the laterally adjoining half shell parts, apart from the space for the collectors 8, space for the solar modules 10 and the energy storage device 12 on the lateral and/or lower edge.

The head restraint half shell 2, arranged rearwardly in the travel direction, has—in particular in the central portion—first and second frames 14, 14' within the plastic cage 6 into which a component 16 of any type can be removably positioned such that, upon rear end collision, it is easily pushed out of the rearward head restraint half shell 2 such that even a passenger seated therebehind is not injured, for example, by providing a correspondingly long strip which is fastened detachably to the head restraint. This component 16 can be, for example, a vanity mirror, illuminated by energy-saving, optionally switchable organic (OLED) and/or polymer (PLED) diodes; a screen of a TV set or for receiving data by means of integrated GMS or GPS technology; a luminous band for short information; a display of a laptop of a UMTS mobile phone and the like, which obtain the energy required for operation from solar modules 10 and energy storage devices 12 of known thin-film element technology contained in the component 16. The component 16 can be covered by a lid 16a with a snap connection, and the lid has on its outer side a plug connector 20 for other energy consumers as well as optionally a connector for a head set and/or microphone. Outside of the frame 14 for the component 16, the head restraint half shell 2, rearwardly arranged in the travel direction, is provided with collectors 8, solar modules 10, and energy storage devices 12 of the same type as in the forward head restraint half shell 1.

Each head restraint half shell 1, 2 is closed off within its edges by a wall 9—in particular of plastic material—which is provided in the direction toward the collectors 8 with a reflective surface in order to enhance the light collected in the collectors 8. The collectors 8 obtain light from the exterior through the (approximately) vertical and the upper narrow side as well as the outer wall surfaces of the two head restraint half shells 1, 2 which for this purpose employ either recesses in the form of holes or slots 1a, 2a, whose numbers, size, and arrangement are to be determined by the designer, or by a light-transparent material which has a design matching that of the central portion of the forward head restraint half shell 1 as closely as possible. The "material" can be also in the form of light-transmissive colored solar modules. When using a protective cover 30 for the head restraint, it must be dimensioned and attached such that the recesses in the head restraint half shells 1, 2 are not covered.

The light receiving surface 8a of the collectors 8 is structured such that total reflection for the light propagating within the collectors 8 is canceled as much as possible. This light is collected and guided at the edge of the collectors to the solar modules 10 and converted therein into electrical energy which is subsequently stored in batteries, high-performance capacitors and the like 12 in thin-film element technology. The electrical connections (not illustrated) are realized, as is known in the art, for example, by means of printed circuits on the grate bars of the plastic cage 6 within the respective head restraint half shells 1, 2 as well as via a plug-in contact between the rearward head restraint half shells 1 and 2 as well as between the rearward head restraint half shell 2 and the insertable component 16.

The energy which is generated and stored in this way within the head restraint can be used, for example, for a motor for extending and retracting the head restraint, for adjusting the vehicle seat, for heating—switchable when needed—the head restraint by means of at least one heating wire 18, which is placed in or about the edge of the head restraint half shell, for operating light emitting diodes 21, as needed, for indicating the charge state of the at least one energy storage device 12, for charging a fuel cell for additionally generating electrical energy by means of an electrochemical process (mounting is possible within the head restraint half shell 2 in a second component 16'), as well as for charging other energy storage devices and actuating other consumers within and/or outside of the vehicle. Should there be insufficient mounting space for the fuel cells in the head restraint, it is possible to attach polymer electrolyte membrane fuel cells below the seats or in the trunk area. By means of air channels in the vehicle seat and the head restraint, air is supplied to the fuel cells, if needed.

Like any conventional head restraint, the head restraint according to the invention can be used as an "emergency pillow" for attending to accident victims when they are pulled out of the back rest of the vehicle seat. Moreover, the head restraint according to the invention has the advantage that it can be heated without "foreign energy".

An increase of the amount of energy that can be produced can be achieved when mirror-like disks guide additional light from the exterior onto the disks, be it manually or by a motor which can be controlled possibly automatically by a sensor.

The parts of the head restraint support which are snapped into place in the back wall can be configured in their interior for receiving energy storage devices 12 when they are tubular, in case that the space in the head restraint is insufficient. The energy storage device 12 can also be positioned as a thin-film element between the head restraint half shells 1, 2 and the solar modules 10.

Also, solar modules 10 can be mounted additionally on the opposite wall of the back rest of the vehicle seat, viewed in the travel direction; they are then actuatable only when the back seat is folded in the vehicle direction, i.e., generally only when leaving the vehicle.

What is claimed is:

1. A head restraint for vehicles, the head restraint comprising:
   two detachably connected half shells having a tubular carrier as a bracket with two stays for securing the head restraint in the back rest of a vehicle seat, wherein the head restraint has an upholstered support for the head of the passenger,
   wherein both of said half shells (1, 2) each having an interior containing a reinforcing plastic cage (6), wherein one of the half shells (1) is arranged forwardly in a travel direction, the upholstered support (3) for the head of the passenger is arranged centrally, wherein two adjoining portions of the forward half shell (1) have collectors (8) for receiving and collecting light as well as for propagation of the light to solar modules (10) for conversion into electrical energy and storing in storage elements (12);
   wherein the other half shell (2) is arranged rearwardly in the travel direction, a first frame (14') is provided in the plastic cage (6) for receiving a first removable component (16') of a polymer electrolyte membrane fuel cell and at least one hydrogen cartridge for additional energy generation.

2. The head restraint according to claim 1, wherein the rearward half shell (2) comprises in the plastic cage (6) a second frame (14) for receiving a detachable second component (16) and also collectors (8) for receiving and collecting light as well as for propagation of the light to solar modules (10) for conversion into electrical energy and storing in storage elements (12).

3. The head restraint according to claim 1, wherein open sides of both of said half shells (1, 2) are closed off by a wall (9), and the collectors (8) has in the interior of the respective half shell (1, 2) a reflective surface in order to enhance the light collected in the collectors.

4. The head restraint according to claim 1, wherein the two half shells (1, 2) have recesses (1a, 2a) in the form of holes in order to guide light from the exterior to the collectors (8).

5. The head restraint according to claim 1, wherein the solar modules (10) are in the form of foils and storage elements (12) being thin-film elements and are arranged along a vertical, narrow side facing the interior of the vehicle as well as the bottom of the head restraint half shell (1,2).

6. The head restraint according to claim 1, wherein a protective cover for the head restraint is configured and arranged such that it does not impede the passage of light through the half shells (1, 2) to the collectors (8).

7. The head restraint according to claim 1, wherein at least one of the head restraint half shells (1, 2) comprises a heating wire (18) about its circumference.

8. The head restraint according to claim 2, wherein the second component (16) is snapped into place into a second frame (14) of the rearward half shell (2), such that in the case of a rear end collision it is easily pushed out of the second frame (14) but remains by a detachable strip-shaped connection within the vicinity of the head restraint.

9. The head restraint according to claim 2, wherein the second component (16) comprises a lid (16a) with a snap-on connection for protecting individual parts of the second component (16) against damage and soiling, and wherein has the lid on its outer surface a plug to provide energy supply to other energy consumers.

10. The head restraint according to claim 9, wherein the lid (16a) has a connector for a headset and/or microphone.

11. The head restraint according to claim 9, wherein the lid (16a) has diodes for indicating the charge state of the energy storage devices (12) in the head restraint.

12. The head restraint according to claim 11, wherein the diodes are switchable.

13. A head restraint for vehicles, the head restraint comprising
   two detachably connected half shells having a tubular carrier as a bracket with two stays for securing the head restraint in the back rest of the vehicle seat, wherein the head restraint has an upholstered support for the head of the passenger, wherein both of said half shells (1, 2) each having an interior containing a reinforcing plastic cage (6), wherein one of the half shells (1) is arranged forwardly in a travel direction, the upholstered support (3) for the head of the passenger is arranged centrally, wherein two adjoining portions of the forward half shell (1) have collectors (8) for receiving and collecting light as well as for propagation of the light to solar modules (10) for conversion into electrical energy and storage in storage elements (12);

wherein the other half shell (2) is arranged rearwardly in the travel direction, and comprises a removable component (16) which has solar modules (10) in a foil shape and at least one energy storage device (12) embodied as thin-film elements which are connectable by lines with one another and with the other energy storage devices (12) of the head restraint;

wherein the removable component (16) connects by plug-in contacts with at least one of the energy storage devices (12) provided therein with lines of the other energy storage devices (12) in the head restraint half shells (1, 2).

* * * * *